United States Patent
Sitaraman et al.

(10) Patent No.: US 6,243,749 B1
(45) Date of Patent: Jun. 5, 2001

(54) DYNAMIC NETWORK ADDRESS UPDATING

(75) Inventors: Aravind Sitaraman, Santa Clara; Jane Jiaying Jin, San Jose; Maria Alice Dos Santos, Redwood City; Sampath Kumar Sthothra Bhasham, Santa Clara, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/169,182

(22) Filed: Oct. 8, 1998

(51) Int. Cl.[7] .................................................. G06F 13/00
(52) U.S. Cl. ........................ 709/223; 709/220; 709/238; 709/245
(58) Field of Search .................................. 709/217, 220, 709/223, 225, 227, 228, 229, 230, 238, 245

(56) References Cited

U.S. PATENT DOCUMENTS

| | | | |
|---|---|---|---|
| 4,769,810 | 9/1988 | Eckberg, Jr. et al. | 370/60 |
| 4,769,811 | 9/1988 | Eckberg, Jr. et al. | 370/60 |
| 4,933,937 | 6/1990 | Konishi | 370/85.13 |
| 5,014,265 | 5/1991 | Hahne et al. | 370/60 |
| 5,224,099 | 6/1993 | Corbalis et al. | 370/94.2 |
| 5,367,517 | 11/1994 | Cidon et al. | 370/54 |
| 5,423,002 | 6/1995 | Hart | 395/200 |
| 5,430,715 | 7/1995 | Corbalis et al. | 370/54 |
| 5,509,006 | 4/1996 | Wilford et al. | 370/60 |
| 5,570,360 | 10/1996 | Klausmeier et al. | 370/60 |
| 5,592,470 | 1/1997 | Rudrapatna et al. | 370/320 |
| 5,668,857 | 9/1997 | McHale | 379/93.07 |
| 5,678,006 | 10/1997 | Valizadeh et al. | 395/200.02 |
| 5,699,521 | 12/1997 | Iizuka et al. | 395/200.15 |
| 5,734,654 | 3/1998 | Shirai et al. | 370/396 |
| 5,805,595 | 9/1998 | Sharper et al. | 370/442 |
| 5,835,720 | 11/1998 | Nelson et al. | 395/200.54 |

(List continued on next page.)

OTHER PUBLICATIONS

Active Software, Inc., "Active Software's Integration System", printed from http://www.activesw.com/products/products.html, on Jul. 24, 1998.

(List continued on next page.)

Primary Examiner—Viet D. Vu
(74) Attorney, Agent, or Firm—Marc S. Hanish; Thelen Reid & Priest LLP

(57) ABSTRACT

An information broker is provided which receives information regarding the updating of IP addresses and distributes the information to subscribing Domain Name Service (DNS) or Dynamic Host Configuration Protocol (DHCP) servers. A list of subscribing servers is maintained by the broker. The broker may broadcast information regarding the allocation of a IP addresses to subscribing DNS servers, which then may be added to the DNS databases or the database may be updated with the new information. The broker may also broadcast information regarding the revocation of IP addresses to subscribing DNS servers, which may then be used to clear DNS entries in the database. Revocation of dynamically allocated IP addresses in networks with multiple DHCP servers may also be simplified by using the broker, where the broker broadcasts information regarding the revocation of IP addresses to subscribing DHCP servers. Utilization of the broker within a segment of the Internet allows a user to determine the dynamically allocated IP address of a user within the segment simply by making a standard DNS query.

98 Claims, 2 Drawing Sheets

U.S. PATENT DOCUMENTS

| | | | |
|---|---|---|---|
| 5,835,725 | 11/1998 | Chiang et al. | 395/200.58 |
| 5,835,727 | 11/1998 | Wong et al. | 395/200.68 |
| 5,838,683 | 11/1998 | Corley et al. | 370/408 |
| 5,845,070 | 12/1998 | Ikudome | 395/187.01 |
| 5,852,607 | 12/1998 | Chin | 370/401 |
| 5,854,901 | 12/1998 | Cole et al. | 395/200.75 |
| 5,898,780 | 4/1999 | Liu et al. | 380/25 |
| 5,918,016 | 6/1999 | Brewer et al. | 395/200.5 |
| 5,926,458 | 7/1999 | Yin | 370/230 |
| 5,974,453 | 10/1999 | Andersen et al. | 709/220 |
| 6,009,103 * | 12/1999 | Woundy | 370/401 |
| 6,055,236 | 4/2000 | Nessett et al. | 370/389 |
| 6,091,951 * | 7/2000 | Sturniolo et al. | 455/432 |
| 6,092,178 * | 7/2000 | Jindal et al. | 712/27 |

OTHER PUBLICATIONS

Ascend Communications, Inc., "Access Control Product Information", 4 pages, unknown date.

Ascend Communications, Inc., "Remote Access Network Security", printed from http://www.ascend.com/1103.html, on Jul. 24, 1998, pp. 1–8.

Droms, R., "Dynamic Host Configuration Protocol," Network Working Group, RFC 1531, Oct. 1993.

NAT and Networks, printed from http://www.csn.tu–chemnitz.de/~mha/linux–ip–nat/diplom/node4.html, on Sep. 19, 1998.

"NAT–PC Webopaedia Definition and Links", 1998, Mecklermedia Corporation, printed from http://webopedia.internet.com/TERM/N/NAT.html, on Sep. 19, 1998, 1 page.

"Network Address Translation Information", printed from http://www.uq.edu.au/~gadmacka/content/natinformation.htm, on Sep. 19, 1998.

Network Registrar, "Regain Confidence and Control Over Your IP Address Infrastructure", American Internet Corporation, Bedford, MA, 1998.

Network Registrar, "Hot Products & Solutions", American Internet Corporation, printed from http://www.american.com/networkregistrar, html, on Jul. 24, 1998.

Network Registrar, "Hot Products & Solutions—IP Address Management: A White Paper", American Internet Corporation, Bedford, MA, printed from http://www.american.com/ip–mgmt.html, on Jul. 24, 1998.

Network Registrar, "Hot Products & Solutions—Deploying Class of Service Using Network Registrar", American Internet Corporation, Bedford, MA, printed from http://american.com/applicationCOS–network.html, on Jul. 24, 1998.

Rigney, et al., "Remote Authentication Dial In User Service (RADIUS)", Network Working Group, RFC 2138, Apr. 1997, pp. 1–57.

"Three Ways to Manage IP Addresses", PC Magazine: IP Address Management, printed from http://www.zdnet.com/pcmag/features/ipmanage/ip–s2.htm, on Sep. 10, 1998.

* cited by examiner

DYNAMIC NETWORK ADDRESS UPDATING

BACKGROUND OF THE INVENTION

1. Field of the Invention

The present invention relates to managing host addresses. More particularly, the present invention relates to managing dynamically allocated host addresses to allow subscribers to reliably locate other subscribers who have been dynamically allocated host addresses.

2. The Background

As shown in FIG. 1, the Internet, or any large computer network, 10 may be described as a group of interconnected computing networks (not shown) that are tied together through a backbone 12. The computing networks, in turn, provide access points, such as access points 14, 16 and 18, through which users may connect to the Internet via a station (a computer having a connection to a network) or host, such as hosts 20, 22, 24, and 26. An access point is essentially a location on the Internet that permits access to the Internet. An access point may include a modem pool (not shown) maintained by an ISP (Internet Services Provider) which enables its subscribers to obtain Internet access through a host having a dial-up connection. Those of ordinary skill in the art will recognize that other types of access methods may be provided by an ISP such as frame relay, leased lines, ATM (asynchronous transfer mode), ADSL, and the like.

Regardless of the access method used, each device (e.g., a host or router) that receives, sends and/or routes information between or among other devices on Internet 10 is configured to communicate with other devices using a communication protocol that may be understood by the other devices. The current communication protocol used by these devices on the Internet is TCP/IP (transmission control protocol/internet protocol). In addition, each device that can send or receive information (e.g., a host device) must also have a unique host address. The type of host address used for the Internet, or an equivalent switched network that uses TCP/IP, is commonly referred to as an IP address. A standard TCP/IP address is 4 bytes (32 bits) in length, providing a total of $2^{32}$ possible IP addresses. Those of ordinary skill in the art will readily recognize that not all of these possible IP addresses are available due to administrative expediencies, such as reserving blocks of IP addresses for future use.

Sending or receiving information using the TCP/IP protocol requires encapsulating information into packets. Each packet includes a header and a payload. The header contains information related to the handling of the payload by a receiving host or routing device, while the payload contains part or all of the user information. The information in the header includes the sender's and the recipient's addresses and is used to route the packet through the Internet until the packet is received by a host having an IP address that matches the packet's destination address (when referring to the source address and destination address of a packet, the source address and destination address are commonly referred to as "SA" and "DA", respectively). This enables users to accurately send and receive information with each other through their respective host computers.

By implementing a protocol common to all devices using Internet 10, users may send and receive information with other users on the Internet in a seamless manner regardless of geographic location or the type of host and/or interconnected network used. While IP addresses themselves are in numerical form, in order to make navigating the sea of addresses simpler, the Domain Name Service (DNS) was formed. DNS enables the central managing of host names to IP addresses. It is actually a distributed database which allows for the dissemination of new host information as needed. There are a great many DNS servers distributed throughout the Internet, and most large ISPs maintain their own DNS server.

FIG. 2 is a diagram illustrating the DNS hierarchy, which is similar to that of a computer file system, At the top of the hierarchy is the root domain 50, which consists of a group of root servers to service the top-level domains. The top level domains are separated into organizational and geographical domains. Many countries have their own top-level domains, such as .uk for the United Kingdom, .de for Germany, and jp for Japan (not shown). The United States has no country-specific top-level domain, but is the main user of the six organizational top-level domains, which are net for network support organizations 52, .gov for government agencies 54, mil for military users 56, org for not for profit organizations 58, .com for commercial enterprises 60, and .edu for educational facilities 62. There are also a near infinite number of lower level domains. Each level of domain names may have another level of domain names below it. For example, a lower level domain .work 64 may be located under the .com domain 60, and the lower level domain .univ 66 may be located under the .edu domain 62. At the lowest level are the hosts. For example, the host labeled overtime 68 may be located under the .work sub-domain under the .com domain while the host labeled vax 70 may be located under the .univ sub-domain under the .edu domain. The proper way to read these two DNS host names would then be overtime.work.com and vax.univ.edu.

The steps of locating an IP address from a host, sub-domain, and domain name proceeds as in the following example. If a user in the vax.univ.edu domain wishes to contact a user with the user name sun in the work.com domain, the first step is to contact its own DNS server. Therefore, if the vax.univ.edu host is configured with a DNS server at the IP address 133.3.1.3, the user sends a DNS request to that IP address. The DNS server then searches for the entry in its database. Generally, DNS servers only maintain a database of host addresses (or sub-domain names) within its own subnet. Therefore, the DNS server would look for an IP address corresponding to the domain/sub-domain combination .univ.edu. It may or may not have information that precise. It may only have information regarding the IP address of the .com domain and not the .work.com domain. If it has information about the IP address of the DNS server of the .work.com domain, it passes this information to the user, which then contacts the .work.com DNS server and requests the IP address of the precise user it wishes to contact in the .work.com domain. If however, the DNS server associated with the vax.univ.edu host only has information about the address of the DNS server of the .com domain, it returns only that address, and the user must recursively navigate down the branches of DNS servers in the com domain until locating the address it needs (in the present example, it only searches down one level, but in more complicated hierarchies it may need to search through many levels of DNS servers).

It is also possible that a higher level DNS server will simply forward the request packet down the hierarchy and wait to inform the user of the host address until it hears back from the lower level DNS server, thus avoiding having to contact the user at each step in the hierarchy. However, this still presents the problem of recursing, which increases the complexity of a search.

The dramatic increase in popularity of the Internet in recent years has created a concern about the number of available IP addresses. ISPs and domains are generally allocated a finite number of IP addresses. The ISPs and domains, therefore, are constantly looking for ways to limit the number of IP addresses they use while still providing access to the greatest number of users.

One solution for mitigating the effect of the number of users requiring host addresses is to dynamically allocate host addresses for users who do not have dedicated connections to the Internet, such as users who use dial-up access methods to connect to an ISP. Dynamic allocation of IP addresses entails having a pool of IP addresses, such as IP address pool, from which an ISP can draw from each time a valid subscriber (who does not use a dedicated connection or a connection that does not have a framed IP address, i.e., a static IP address) seeks to access the Internet. Once the subscriber logs on to an ISP and is properly authenticated, the ISP allocates an IP address for use by the user. This task is normally performed by a Dynamic Host Configuration Protocol (DHCP) server existing on the ISP (or other local segment of the Internet).

Upon log-off, the DHCP server releases the assigned/allocated IP address, rendering that IP address available for subsequent use by another user. In this way, a set of IP addresses can be used to provide access to a number of users that exceed the number of IP address comprising the IP address pool, assuming that at any given time the number of users seeking to log-on and obtain dynamic IP addresses is less than or equal to the number of IP address available in the IP address pool.

Recently, software advances have allowed users to begin to merge existing technologies, like telephone service, into their Internet service. One example of this phenomenon is a utility known as Internet Phone. With the Internet Phone utility installed on his computer, a user may "dial" a friend's computer and speak (either through a microphone connected to the computer or through an integrated telephone) with his friend, who has a similar system. Communication is accomplished over the Internet utilizing a protocol called Voice over IP (VoIP). VoIP utilizes IP packets to carry digital audio transmissions. Through data compression techniques (which includes filtering out much o the silences that accompany most conversations), it is possible to conduct real-time conversations through the Internet.

Another example of the technology-merging phenomenon is in Internet Chat. Internet Chat is similar to e-mail in that users type messages to one another on their screens. However, and Internet Chat session takes place in real-time. Therefore, when a user types a sentence on his screen and presses <enter>, the message is transmitted instantaneously to the recipient, who then may respond to the message. The recipient may then respond in a similar fashion, creating a real-time, typed "conversation".

A problem arises in using these technologies when a user wishes to initiate a conversation or chat session with a dial-up user. There is currently no way for a system to resolve a dynamically assigned destination address. Therefore, programs like Internet Chat or Internet Phone are virtually useless when used in conjunction with dial-up users. The one solution is to determine the users actual dynamic IP address. This, however, requires efforts on both parties to the conversation.

Additionally, it has become more and more common to have multiple DHCP servers, rather than a single DHCP server, for a single ISP or local segment of the Internet. These multiple DHCP servers are distributed throughout the ISP or local segment of the Internet and may contain different information.

Multiple DHCP servers may tend to create a problem with regards to revocation of dynamically allocated IP addresses. When an ISP determines it should revoke a dynamically allocated IP addresses (such as when a dial-up user disconnects from the ISP), it must then search each of the DHCP servers to make sure the address is removed from all DHCP servers which have stored the dynamically allocated address.

What is needed is a solution which overcomes the drawbacks of the prior art.

SUMMARY OF THE INVENTION

An information broker is provided which receives information regarding the updating of IP addresses and distributes the information to subscribing Domain Name Service (DNS) or Dynamic Host Configuration Protocol (DHCP) servers. A list of subscribing servers is maintained by the broker. The broker may broadcast information regarding the allocation of a IP addresses to subscribing DNS servers, which then may be added to the DNS databases or the database may be updated with the new information. The broker may also broadcast information regarding the revocation of IP addresses to subscribing DNS servers, which may then be used to clear DNS entries in the database. Revocation of dynamically allocated IP addresses in networks with multiple DHCP servers may also be simplified by using the broker, where the broker broadcasts information regarding the revocation of IP addresses to subscribing DHCP servers. Utilization of the broker within a segment of the Internet allows a user to determine the dynamically allocated IP address of a user within the segment simply by making a standard DNS query.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

The present invention utilizes a broker to publish information regarding dynamically allocated addresses to DNS and DHCP servers. The broker may also be used to update DNS servers regarding newly assigned static IP addresses.

Figure 1:
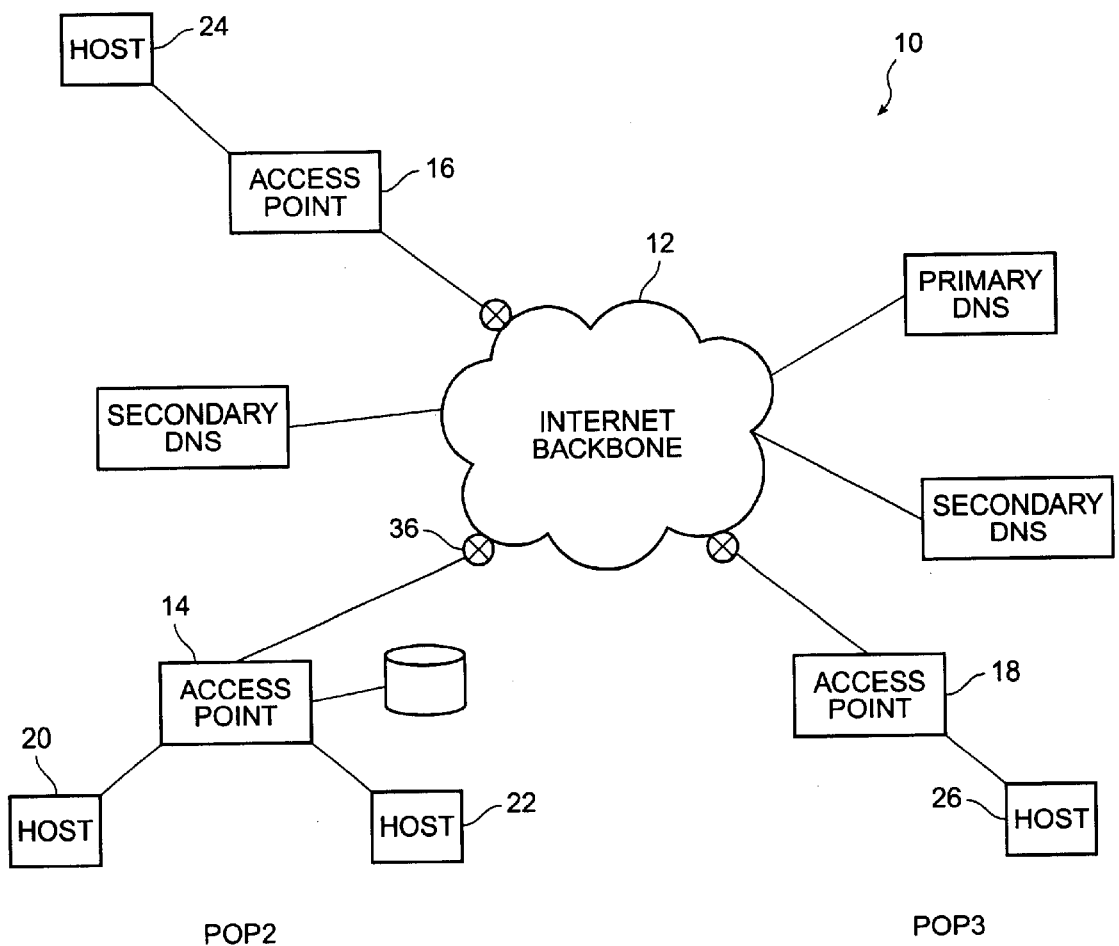
FIG. 1 is a prior art block diagram of the Internet.
Figure 2:
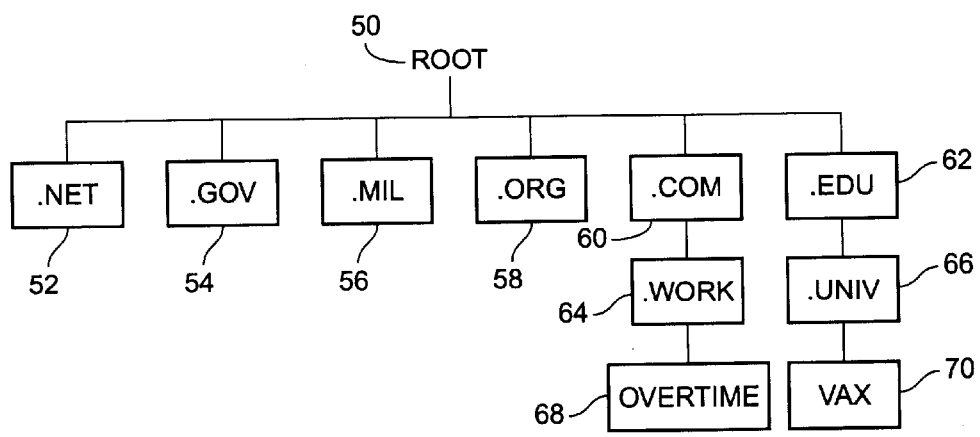
FIG. 2 is a prior art block diagram illustrating the hierarchy of some top level domain names.
Figure 3:
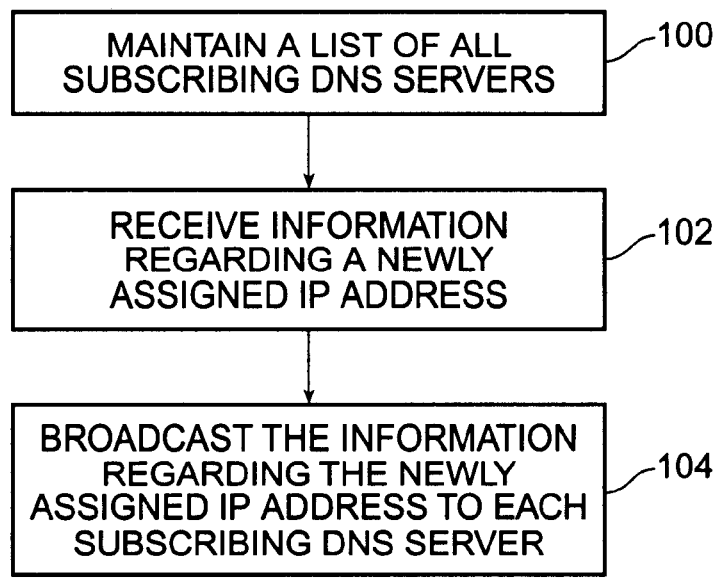
FIG. 3 is a flow diagram illustrating a method for managing IP addresses in a network including one or more Domain Name Service (DNS) servers in accordance with a presently preferred embodiment of the invention.

FIG. 3 is a flow diagram illustrating a method for updating one or more DNS servers in accordance with a preferred embodiment of the present invention. At step 100, the broker maintains a list of all subscribing DNS servers. A subscribing DNS server is any DNS server that wishes to be updated by the broker. Therefore, generally every DNS server maintained by an ISP will be a subscribing DNS server with regards to a broker maintained by the ISP. It is also possible for DNS servers outside the ISP to subscribe as well. When a new DNS server wishes to subscribe or an existing DNS server wishes to unsubscribe, it need simply send a message so indicating to the broker. At step 102, the broker receives information regarding a newly assigned IP address. This information will most likely have been sent from a DHCP server in the case of dynamically allocated IP addresses and from a DNS server or ISP coordinator in the case of newly assigned static IP addresses.

At step 104, the broker broadcasts the information regarding the newly assigned IP address to each subscribing DNS server. Each DNS server may then add the newly assigned IP address to its database. In the case of dynamically allocated IP address, it is common for the newly assigned IP address to be replacing an existing IP address (which may have been assigned to a different user before), in which case the DNS servers may update their servers to indicate this change. The broadcasting may take the form of sending an allocation event message throughout the network containing the appropriate information.

A user may then find out the dynamically allocated or newly allocated address of another user by simply making a standard DNS query, allowing for utilities such as Internet Chat or Internet Phone to operate at full capability.

Figure 4:
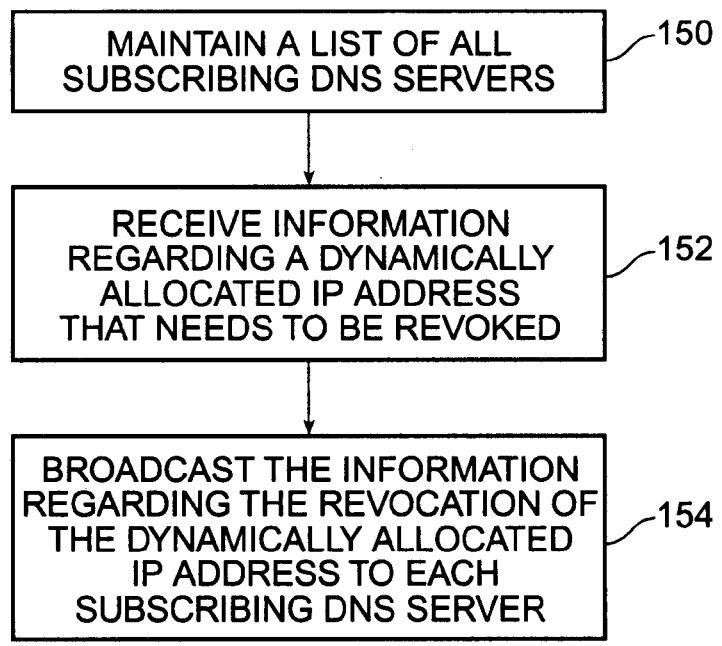
FIG. 4 is a flow diagram illustrating a method for managing IP addresses in a network including one or more Dynamic Host Configuration Protocol (DHCP) servers in accordance with a presently preferred embodiment of the invention.

FIG. 4 is a flow diagram illustrating a method for updating one or more DNS servers in accordance with a another embodiment of the present invention. At step 150, the broker maintains a list of all subscribing DHCP and DNS servers. A subscribing DHCP or DNS server is any DHCP or DNS server that wishes to be maintained by the broker. Therefore, generally every DHCP or DNS server maintained by an ISP will be a subscribing DHCP or DNS server with regards to a broker maintained by the ISP. It is also possible for DHCP or DNS servers outside the ISP to subscribe as well. When a new DHCP or DNS server wishes to subscribe or an existing DHCP or DNS server wishes to unsubscribe, it need simply send a message so indicating to the broker. At step 152, the broker receives information regarding a dynamically allocated IP address that needs to be revoked. This information will most likely have been sent from a DHCP server which had been alerted as to a user disconnecting from the service, or directly from software tracking when users disconnect from the service.

At step 154, the broker broadcasts the information regarding the revocation of the dynamically allocated IP address to each subscribing DHCP or DNS server. Each subscribing DHCP or DNS server may then update their databases to reflect this change. Subscribing DNS servers will simply clear the corresponding record from their databases, while subscribing DHCP servers may clear the record and return the dynamic IP address to a pool. This allows for the effective management of revoking dynamically allocated IP addresses. The broadcasting may take the form of sending a revocation event message through the network containing the appropriate information. In most systems currently being used, there is only a single DHCP server, or there are multiple DHCP servers but they do not share common information (i.e. not distributed). In these systems, there is no need to maintain a list of subscribing DHCP servers as there is no need for the broker to update the DHCP servers.

The broker itself may be executed in either a software or a hardware application. The broker may be designed to utilize the Common Object Request Broker Architecture (CORBA), which handles the communication of messages to and from objects in a distributed, multi-platform environment. CORBA provides a standard way of executing program modules in a distributed environment. The broker, therefore, may be incorporated into an Object Request Broker (ORB) within a CORBA compliant network.

To make a request of an ORB, a client may use a dynamic invocation interface (which is a standard interface which is independent of the target object's interface) or an Object Management Group Interface Definition Language (OMG IDL) stub (the specific stub depending on the interface of the target object). For some functions, the client may also directly interact with the ORB. The object is then invoked. When an invocation occurs, the ORB core arranges so a call is made to the appropriate method of the implementation. A parameter to that method specifies the object being invoked, which the method can use to locate the data for the object. When the method is complete, it returns, causing output parameters or exception results to be transmitted back to the client.

The broker may also be applied to any type of network address, rather than simply IP addresses. The use of the Internet as an example in this application is not intended to limit the scope of the invention to use on the Internet, as it may be used in a wide variety of networks. Likewise, the use of the terms DNS server and DHCP server is illustrative only and should be read to include any type of servers that may perform tasks that handle network addressing.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for assigning network addresses in a network including one or more Domain Name Service (DNS) servers, said method including:

allocating a network address;

sending information regarding said allocated network address to a broker; and broadcasting said information regarding said allocated network address to the one or more DNS servers using said broker.

2. The method of claim 1, wherein said allocating includes dynamically allocating a network address.

3. The method of claim 1, wherein said allocating includes allocating a static network address.

4. The method of claim 1, further including:

receiving said broadcast information regarding said allocated network address in each of said one or more DNS servers; and updating each of said one or more DNS servers with said broadcast information regarding said allocated network address.

5. The method of claim 1, wherein the one or more DNS servers are only those DNS servers which have subscribed to said broker, and the method further includes maintaining a list of those DNS servers which have subscribed to said broker.

6. The method of claim 5, wherein said broadcasting includes sending information regarding said dynamically allocated network address to only those DNS servers which have subscribed to said broker.

7. A method for revoking network addresses in a network including one or more DNS servers, said method including:

revoking a dynamically allocated network address;

sending information regarding said revoked dynamically allocated network address to a broker; and broadcasting said information regarding said revoked dynamically allocated network address to the one or more DNS servers using said broker.

8. The method of claim 7, further including:
receiving said broadcast information regarding said revoked dynamically allocated network address in each of said one or more DNS servers; and
updating each of said one or more DNS servers with said broadcast information regarding said revoked dynamically allocated network address.

9. The method of claim 7, wherein the one or more DNS servers are only those DNS servers which have subscribed to said broker, and the method further includes maintaining a list of those DNS servers which have subscribed to said broker.

10. The method of claim 9, wherein said broadcasting includes sending information regarding said revoked dynamically allocated network address to only those DNS servers which have subscribed to said broker.

11. The method of claim 7, wherein the network further includes one or more Dynamic Host Configuration Protocol (DHCP) servers, and said broadcasting includes broadcasting said information regarding revoked dynamically allocated networked address to the one or more DHCP servers using said broker.

12. The method of claim 11, further including:
receiving said broadcast information regarding said allocated network address in each of said one or more DNS servers;
updating each of said one or more DNS servers with said broadcast information regarding said allocated network address;
receiving said broadcast information regarding said revoked dynamically allocated network address in each of said one or more DHCP and one or more DNS servers; and
updating each of said one or more DHCP servers and one or more DNS servers with said broadcast information regarding said revoked dynamically allocated network address.

13. The method of claim 11, wherein the one or more DNS servers are only those DNS servers which have subscribed to said broker, the one or more DHCP servers are only those DHCP servers which have subscribed to said broker, and the method further includes maintaining a list of those DNS servers and DHCP servers which have subscribed to said broker.

14. The method of claim 13, wherein said broadcasting information regarding said allocated network address includes sending information regarding said allocated network address to only those DNS servers which have subscribed to said broker, and said broadcasting information regarding said revoked dynamically allocated network address includes sending information regarding said revoked dynamically allocated network address to only those DNS servers and DHCP servers which have subscribed to said broker.

15. A method for managing network addresses in a network including one or more Domain Name Service (DNS) servers, said method including:
allocating a network address;
sending information regarding said allocated network address to a broker;
broadcasting said information regarding said allocated network address to the one or more DNS servers using said broker;
revoking a dynamically allocated network address;
sending information regarding said dynamically allocated network address to said broker; and
broadcasting said information regarding said dynamically allocated network address to the one or more DNS servers using said broker.

16. The method of claim 15, wherein said allocating includes dynamically allocating a network address.

17. The method of claim 15, wherein said allocating includes allocating a static network address.

18. The method of claim 15, further including:
receiving said broadcast information regarding said allocated network address in each of said one or more DNS servers;
updating each of said one or more DNS servers with said broadcast information regarding said allocated network address;
receiving said broadcast information regarding said revoked dynamically allocated network address in each of said one or more DNS servers; and
updating each of said one or more DNS servers with said broadcast information regarding said revoked dynamically allocated network address.

19. The method of claim 15, wherein the one or more DNS servers are only those DNS servers which have subscribed to said broker, and the method further includes maintaining a list of those DNS servers which have subscribed to said broker.

20. The method of claim 19, wherein said broadcasting information regarding said allocated network address includes sending information regarding said allocated network address to only those DNS servers which have subscribed to said broker, and said broadcasting information regarding said revoked dynamically allocated network address includes sending information regarding said revoked dynamically allocated network address to only those DNS servers which have subscribed to said broker.

21. The method of claim 15, wherein the network further includes one or more Dynamic Host Configuration Protocol (DHCP) servers, and said broadcasting includes broadcasting said information regarding revoked dynamically allocated networked address to the one or more DHCP servers using said broker.

22. The method of claim 21, further including:
receiving said broadcast information regarding said allocated network address in each of said one or more DNS servers;
updating each of said one or more DNS servers with said broadcast information regarding said allocated network address;
receiving said broadcast information regarding said revoked dynamically allocated network address in each of said one or more DHCP and one or more DNS servers; and
updating each of said one or more DHCP servers and one or more DNS servers with said broadcast information regarding said revoked dynamically allocated network address.

23. The method of claim 21, wherein the one or more DNS servers are only those DNS servers which have subscribed to said broker, the one or more DHCP servers are only those DHCP servers which have subscribed to said broker, and the method further includes maintaining a list of those DNS servers and DHCP servers which have subscribed to said broker.

24. The method of claim 23, wherein said broadcasting information regarding said allocated network address includes sending information regarding said allocated network address to only those DNS servers which have subscribed to said broker, and said broadcasting information regarding said revoked dynamically allocated network address includes sending information regarding said revoked dynamically allocated network address to only those DNS servers and DHCP servers which have subscribed to said broker.

25. A method for managing IP addresses in a network segment of the Internet, the network segment including one or more DNS servers, the method including:

receiving information regarding an assigned IP address;

broadcasting said information regarding an assigned IP address to the one or more DNS servers using a broker, for eventual update of the one or more DNS servers.

26. The method of claim 25, wherein said receiving information regarding an assigned IP address includes receiving information regarding an assigned IP address from a DHCP server.

27. The method of claim 25, wherein said information regarding an assigned IP address is information regarding a dynamically allocated IP address.

28. The method of claim 25, wherein said information regarding an assigned IP address is information regarding a static IP address.

29. The method of claim 25, further including maintaining a list of subscribing DNS servers.

30. The method of claim 29, wherein said broadcasting said information regarding an assigned IP address includes broadcasting said information regarding an assigned IP address only to subscribing DNS servers.

31. A method for managing IP addresses in a network segment of the Internet, the network segment including one or more DNS servers, the method including:

receiving information regarding a revoked dynamically allocated IP address; and broadcasting said information regarding a revoked dynamically allocated IP address to the one or more DNS servers using a broker, for eventual update of the one or more DNS servers.

32. The method of claim 31, wherein said receiving information regarding a revoked dynamically allocated IP address includes receiving information regarding a revoked dynamically allocated IP address from a DHCP server.

33. The method of claim 25, further including maintaining a list of subscribing DNS servers.

34. The method of claim 33, wherein said broadcasting said information regarding a revoked dynamically allocated IP address includes broadcasting said information regarding a revoked dynamically allocated IP address only to subscribing DNS servers.

35. The method of claim 31, wherein the network segment of the Internet further includes one or more DHCP servers and said broadcasting said information regarding a revoked dynamically allocated IP address includes broadcasting said information regarding a revoked dynamically allocated IP address to the one or more DHCP servers and the one or more DNS servers.

36. The method of claim 35, further including maintaining a list of subscribing DNS servers and DHCP servers.

37. The method of claim 36, wherein said broadcasting said information regarding a revoked dynamically allocated IP address includes broadcasting said information regarding a revoked dynamically allocated IP address only to subscribing DNS servers and DHCP servers.

38. A method for managing IP addresses in a network segment of the Internet, the network segment including one or more DNS servers, the method including:

receiving information regarding an assigned IP address;

broadcasting said information regarding an assigned IP address to the one or more DNS servers using a broker, for eventual update of the one or more DNS servers;

receiving information regarding a revoked dynamically allocated IP address; and broadcasting said information regarding a revoked dynamically allocated IP address to the one or more DNS servers using said broker, for eventual update of the one or more DNS servers.

39. The method of claim 38, wherein said receiving information regarding an assigned IP address includes receiving information regarding an assigned IP address from a DHCP server.

40. The method of claim 38, wherein said receiving information regarding a revoked dynamically allocated IP address includes receiving information regarding a revoked dynamically allocated IP address from a DHCP server.

41. The method of claim 38, wherein said information regarding an assigned IP address is information regarding a dynamically allocated IP address.

42. The method of claim 38, wherein said information regarding an assigned IP address is information regarding a static IP address.

43. The method of claim 38, further including maintaining a list of subscribing DNS servers.

44. The method of claim 43, wherein said broadcasting said information regarding an assigned IP address includes broadcasting said information regarding an assigned IP address only to subscribing DNS servers, and said broadcasting said information regarding a revoked dynamically allocated IP address includes broadcasting said information regarding a revoked dynamically allocated IP address only to subscribing DNS servers.

45. The method of claim 38, wherein the network segment of the Internet further includes one or more DHCP servers and said broadcasting said information regarding a revoked dynamically allocated IP address includes broadcasting said information regarding a revoked dynamically allocated IP address to the one or more DHCP servers and the one or more DNS servers.

46. The method of claim 45, further including maintaining a list of subscribing DNS servers and DHCP servers.

47. The method of claim 46, wherein said broadcasting said information regarding an assigned IP address includes broadcasting said information regarding an assigned IP address only to subscribing DNS servers, and said broadcasting said information regarding a revoked dynamically allocated IP address includes broadcasting said information regarding a revoked dynamically allocated IP address only to subscribing DNS servers and DHCP servers.

48. A method for dynamically allocating a network address to a subscriber in a communications network, the communications network having one or more DNS servers, the method comprising:

assigning a host address to the subscriber by selecting an address from a pool of available network addresses, said assigning step performed in response to the subscriber attempting to log-on to the communications network;

sending information regarding said subscriber as well as said host address to a broker;

utilizing said broker to broadcast said information regarding said subscriber as well as said host address to the one or more DNS servers; and updating the one or more DNS servers with said information regarding said subscriber as well as said host address.

49. The method of claim 48, wherein the one or more DNS servers are only those DNS servers which have subscribed to said broker, and the method further includes maintaining a list of those DNS servers which have subscribed to said broker.

50. A method for revoking a dynamically allocated network address assigned by a DHCP server in a communications network, the communications network having one or more DNS servers, the method comprising:

removing the dynamically allocated network address from the DHCP server which assigned the address;

returning the dynamically allocated network address to a pool of available addresses associated with said DHCP server which assigned the address;

sending information regarding the dynamically allocated network address to a broker;

utilizing said broker to broadcast said information regarding the dynamically allocated network address to the one or more DNS servers; and updating the one or more DNS servers with said information regarding said dynamically allocated network address.

51. The method of claim 50, wherein the one or more DNS servers are only those DNS servers which have subscribed to said broker, and the method further includes maintaining a list of those DNS servers which have subscribed to said broker.

52. The method of claim 50, wherein the communications network further has a plurality of DHCP servers, and said utilizing further includes utilizing said broker to broadcast information regarding the dynamically allocated network address to the plurality of DHCP servers.

53. The method of claim 52, wherein the plurality of DHCP servers are only those DHCP servers which have subscribed to said broker, and the method further includes maintaining a list of those DNS servers which have subscribed to said broker.

54. A communications network including:

one or more DNS servers, which maintain a list of assigned host addresses within the communications network;

an address allocator, which allocates a network address to a host on the communications network;

a transmitter, which sends information regarding said allocated network address to a broker; and said broker having a broadcaster, which broadcasts said information regarding said allocated network address to said one or more DNS servers.

55. The communications network of claim 54, wherein said address allocator is a DHCP server.

56. The communications network of claim 54, wherein said network address is a status network address.

57. The communications network of claim 54, wherein said broker further includes a list of subscribing DNS servers and broadcasts said information regarding said allocated network address only to the subscribing DNS servers.

58. The communications network of claim 54, wherein said one or more DNS servers receive said broadcast information regarding said allocated network address and update themselves with said information.

59. A communications network including:

one or more DNS servers;

an address revoker, which revokes a dynamically allocated network address from a host on the communications network;

a transmitter, which sends information regarding said revoked dynamically allocated network address to a broker; and said broker having a broadcaster, which broadcasts said information regarding said revoked dynamically allocated network address to said one or more DNS servers.

60. The communications network of claim 59, wherein said broker further includes a list of subscribing DNS servers and broadcasts said information regarding said revoked dynamically allocated network address only to the subscribing DNS servers.

61. The communications network of claim 59, wherein said one or more DNS servers receives said broadcast information regarding said revoked dynamically allocated network address and update themselves with said information.

62. A communications network including:

one or more DNS servers, which maintain a list of assigned host addresses within the communications network;

an address allocator, which allocates a network address to a first host on the communications network;

a transmitter, which sends information regarding said allocated network address to a broker;

said broker having a broadcaster, which broadcasts said information regarding said allocated network address to said one or more DNS servers; and an address revoker, which revokes a dynamically allocated network address from a second host on the communications network, wherein said transmitter further sends information regarding said revoked dynamically allocated network address to said broker, and wherein said broadcaster further broadcasts said information regarding said revoked dynamically allocated network address to said one or more DNS servers.

63. The communications network of claim 62, wherein said broker further includes a list of subscribing DNS servers, and wherein said broadcaster broadcasts said information regarding said allocated network address only to the subscribing DNS servers and broadcasts said information regarding said revoked dynamically allocated network address only to the subscribing DNS servers.

64. The communications network of claim 62, wherein said one or more DNS servers receive said broadcast information regarding said allocated network address and update themselves with said information, and said one or more DNS servers receive said broadcast information regarding said revoked dynamically allocated network address and update themselves with said information.

65. The communications network of claim 62, further including one or more DHCP servers, wherein said broadcaster further broadcasts said information regarding said revoked dynamically allocated network address to said one or more DHCP servers.

66. The communications network of claim 65, wherein said broker further includes a list of subscribing DNS servers and DHCP servers, and said broadcaster broadcasts said information regarding said allocated network address only to the subscribing DNS servers and broadcasts said information regarding said revoked dynamically allocated network address only to the subscribing DNS servers and DHCP servers.

67. The communications network of claim 65, wherein said one or more DNS servers receive said broadcast information regarding said allocated network address and update themselves with said information, and wherein said one or more DHCP servers receive said broadcast information regarding said revoked dynamically allocated network address, update themselves with said information, and return said revoked dynamically allocated network address to a pool of available addresses.

68. A broker for managing host addresses assigned to subscribers in a communications network, including:
   a receiver, which receives information regarding a subscriber and an assigned host address, said assigned host address assigned to the subscriber by selecting an address from a pool of available network addresses in response to the subscriber attempting to log on to the communications network; and
   a broadcaster which broadcasts said information regarding said subscriber as well as said assigned host address to one or more DNS servers for eventual update.

69. The broker of claim 68, further including a database manager, which maintains a list of subscribing DNS servers, wherein said broadcaster broadcasts said information and said assigned host address only to the subscribing DNS servers.

70. A broker for managing host addresses assigned to subscribers in a communications network, said broker including:
   a receiver, which receives information regarding a revoked dynamically assigned host address, which was revoked in response to a subscriber attempting to log off the communications network; and
   a broadcaster which broadcasts said information regarding said subscriber as well as said revoked dynamically assigned host address to one or more DNS servers for eventual update and release of said dynamically assigned host address into one or more pools of available addresses.

71. The broker of claim 70, further including a database manager, which maintains a list of subscribing DNS servers, wherein said broadcaster broadcasts said information and said assigned host address only to the subscribing DNS servers.

72. The broker of claim 70, wherein said broadcaster further broadcasts said information regarding said subscriber as well as said revoked dynamically assigned host address to one or more DHCP servers for eventual update and release of said dynamically assigned host address into one or more pools of available addresses.

73. The broker of claim 72, further including a database manager, which maintains a list of subscribing DHS and DHCP servers, wherein said broadcaster broadcasts said information and said assigned host address only to the subscribing DNS servers and DHCP servers.

74. A broker for managing host addresses assigned to subscribers in a communications network, said broker including:
   a receiver, which receives information regarding a subscriber and an assigned host address, said assigned host address assigned to said subscriber by selecting an address from a pool of available network addresses in response to said subscriber attempting to log on to a communications network, and which receives information regarding a revoked dynamically assigned host address, which was revoked in response to a subscriber attempting to log off the communications network; and
   a broadcaster which broadcasts said information regarding said subscriber as well as said assigned host address to one or more DNS servers for eventual update, and which broadcasts said information regarding said subscriber as well as said revoked dynamically assigned host address to said one or more DNS servers for eventual update.

75. The broker of claim 74, further including a database manager, which maintains a list of subscribing DNS servers, wherein said broadcaster broadcasts said information and said assigned host address only to the subscribing DNS servers, and broadcasts said information regarding said revoked dynamically allocated host address only to the subscribing DNS servers.

76. A broker for managing host addresses assigned to subscribers in a communications network, said broker including:
   a receiver, which receives information regarding a subscriber and an assigned host address, said assigned host address assigned to said subscriber by selecting an address from a pool of available network addresses in response to said subscriber attempting to log on to a communications network, and which receives information regarding a revoked dynamically assigned host address, which was revoked in response to a subscriber attempting to log off the communications network; and
   a broadcaster which broadcasts said information regarding said subscriber as well as said assigned host address to one or more DNS servers for eventual update, and which broadcasts said information regarding said subscriber as well as said revoked dynamically assigned host address to one or more DNS or DHCP servers for eventual update and release of said dynamically assigned host address into one or more pools of available addresses.

77. The broker of claim 76, further including a database manager, which maintains a list of subscribing DNS servers and DHCP servers, wherein said broadcaster broadcasts said information and said assigned host address only to the subscribing DNS servers and broadcasts said information regarding said revoked dynamically allocated host address only to the subscribing DNS servers and DHCP servers.

78. A program storage device readable by a machine, tangibly embodying a program of instructions executable by the machine to perform a method for managing network addresses in a network including one or more Domain Name Service (DNS) servers, said method including:
   receiving information regarding an allocated network address; and
   broadcasting said information regarding said allocated network address to the one or more DNS servers using a broker, for the eventual update of the one or more DNS servers.

79. The program storage device of claim 78, wherein said allocated network address is a dynamically allocated network address.

80. The program storage device of claim 78, wherein said allocated network address is a static network address.

81. The program storage device of claim 78, wherein the one or more DNS servers are only those DNS servers which have subscribed to said broker, and the method further includes maintaining a list of those DNS servers which have subscribed to said broker.

82. The program storage device of claim 81, wherein said broadcasting further includes sending information regarding said allocated network address to only those DNS servers which have subscribed to said broker.

83. A program storage device readable by a machine, tangibly embodying a program of instructions executable by the machine to perform a method for managing network addresses in a network including one or more DNS servers, said method including:

receiving information regarding a revoked dynamically allocated network address; and broadcasting said information regarding said revoked dynamically allocated network address to the one or more DNS servers using a broker, for eventual update of the one or more DNS servers.

84. The program storage device of claim 83, wherein the one or more DNS servers are only those DNS servers which have subscribed to said broker and the method further includes the step of maintaining a list of those DNS servers which have subscribed to said broker.

85. The program storage device of claim 84, wherein said broadcaster sends information regarding said revoked dynamically allocated network address to only those DNS servers which have subscribed to said broker.

86. The program storage device of claim 83, wherein the network further includes one or more DHCP servers, and said broadcasting further includes broadcasting said information regarding said revoked dynamically allocated network address to the one or more DHCP servers using said broker, for eventual update of the one or more DHCP servers.

87. The program storage device of claim 86, wherein the one or more DHCP servers are only those DHCP servers which have subscribed to said broker, and the method further includes of maintaining a list of those DNS servers and DHCP servers which have subscribed to said broker.

88. The program storage device of claim 87, wherein said broadcasting further includes broadcasting said information regarding said revoked dynamically allocated network address to only those DNS servers and DHCP server which have subscribed to said broker.

89. A program storage device readable by a machine, tangibly embodying a program of instructions executable by the machine to perform a method for managing network addresses in a network including one or more DNS servers, the method including:

receiving information regarding an assigned network address;

broadcasting said information regarding an assigned network address to the one or more DNS servers using a broker, for eventual update of the one or more DNS servers;

receiving information regarding a revoked dynamically allocated network address; and broadcasting said information regarding a revoked dynamically allocated network address to the one or more DNS servers using said broker, for eventual update of the one or more DNS servers.

90. The program storage device of claim 89, wherein said receiving information regarding an assigned network address includes receiving information regarding an assigned network address from a DHCP server.

91. The program storage device of claim 89 wherein said receiving information regarding a revoked dynamically allocated network address includes receiving information regarding a revoked dynamically allocated network address from a DHCP server.

92. The program storage device of claim 89, wherein said information regarding an assigned network address is information regarding a dynamically allocated network address.

93. The program storage device of claim 89, wherein said information regarding an assigned network address is information regarding a static network address.

94. The program storage device of claim 89, wherein the method further includes maintaining a list of subscribing DNS servers.

95. The program storage device of claim 94, wherein said broadcasting said information regarding an assigned network address includes broadcasting said information regarding an assigned network address only to subscribing DNS servers, and said broadcasting said information regarding a revoked dynamically allocated network address includes broadcasting said information regarding a revoked dynamically allocated network address only to subscribing DNS servers.

96. The program storage device of claim 89, wherein the network further includes one or more DHCP servers, wherein said broadcasting said information regarding an assigned network address further includes broadcasting said information regarding said assigned network address to the one or more DHCP servers using said broker, for eventual update of the one or more DHCP servers, and wherein said broadcasting said information regarding a revoked dynamically allocated network address further includes broadcasting said information regarding said revoked dynamically assigned network address to the one or more DHCP servers using said broker, for eventual update of the one or more DHCP servers.

97. The program storage device of claim 96, wherein the one or more DHCP servers are only those DHCP servers which have subscribed to said broker, and the method further includes maintaining a list of those DNS servers and DHCP servers which have subscribed to said broker.

98. The program storage device of claim 97, wherein said broadcasting said information regarding said assigned network address further includes broadcasting only to those DNS servers and DHCP servers which have subscribed to said broker, and said broadcasting said information regarding a revoked dynamically allocated network address further includes broadcasting said information regarding said revoked dynamically assigned network address to only those DNS servers and DHCP servers which have subscribed to said broker.

* * * * *

UNITED STATES PATENT AND TRADEMARK OFFICE
CERTIFICATE OF CORRECTION

PATENT NO. : 6,243,749 B1  
DATED : June 5, 2001  
INVENTOR(S) : Aravind Sitaraman; Jane Jiaying Jin; Maria Alice Dos Santos; Sampath Kumar Sthothra Bhasham Page 1 of 2

It is certified that error appears in the above-identified patent and that said Letters Patent is hereby corrected as shown below:

Title page,
ABSTRACT,
Line 7, delete "a".

Column 2,
Line 12, replace ".uk" with -- *.uk* --.
Line 12, replace ".de" with -- *.de* --.
Line 13, replace "jp" with -- *.jp* --.
Line 16, replace "net" with -- *.net* --.
Line 16, replace ".gov" with -- *.gov* --.
Line 17, replace "mil" with -- *mil* --.
Line 17, replace "org" with -- *.org* --.
Line 18, replace ".com" with -- *.com* --.
Line 19, replace ".edu" with -- *.edu* --.
Line 22, replace ".work" with -- *.work* --.
Line 23, replace ".com" with -- *.com* --.
Line 24, replace ".univ" with -- *.univ* --.
Line 24, replace ".edu" with -- *.edu* --.
Line 26, replace ".work" with -- *.work* --.
Line 27, replace "vax" with -- *vax* --.
Line 27, replace ".com" with -- *.com* --.
Line 28, replace ".univ" with -- *.univ* --.
Line 28, replace ".edu" with -- *edu* --.
Line 30, replace "overtime.work.com" with -- *obertime.work.com* --.
Line 30, replace "vax.univ.edu" with -- *vax.univ.edu* --.
Line 33, replace "vax.univ.edu" with -- *vax..univ.edu* --.
Line 34, replace "sun" with -- *sun* --.
Line 34, replace "work.com" with -- *work.com* --.
Line 43, replace ".univ.edu" with -- *univ.edu* --.
Line 45, replace ".com" with -- *.com* --.
Line 46, replace ".work.com" with -- *.work.com* --.
Line 47, replace ".work.com" with -- *.work.com* --.
Line 48, replace ".work.com" with -- *.work.com* --.
Line 50, replace ".work.com" with -- *work.com* --.
Line 51, replace "vax.univ.edu" with -- *vax.univ.edu* --.
Line 53, replace ".com" with -- *.com* --.
Line 55, replace ".com" with -- *.com* --.

UNITED STATES PATENT AND TRADEMARK OFFICE
CERTIFICATE OF CORRECTION

PATENT NO.   : 6,243,749 B1
DATED        : June 5, 2001
INVENTOR(S)  : Aravind Sitaraman; Jane Jiaying Jin; Maria Alice Dos Santos; Sampath Kumar Sthothra Bhasham It is certified that error appears in the above-identified patent and that said Letters Patent is hereby corrected as shown below:

Column 3,
Line 41, replace "o" with -- of --.
Line 47, replace "and" with -- the --.

Column 5,
Line 27, delete "a".

Column 9,
Line 55, after "servers" insert -- , --.

Column 10,
Line 38, after "servers" insert -- , --.

Column 15,
Line 35, delete "of".

Signed and Sealed this

Twenty-second Day of January, 2002

Attest:

Attesting Officer

JAMES E. ROGAN
Director of the United States Patent and Trademark Office